United States Patent
Suga et al.

(10) Patent No.: US 12,024,629 B2
(45) Date of Patent: Jul. 2, 2024

(54) POLYCARBONATE-BASED RESIN, PRODUCTION METHOD THEREFOR, AND POLYCARBONATE-BASED RESIN COMPOSITION

(71) Applicant: IDEMITSU KOSAN CO., LTD., Tokyo (JP)

(72) Inventors: Koichi Suga, Sodegaura (JP); Yumi Nakayama, Kimizu (JP); Aki Yamada, Sodegaura (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 89 days.

(21) Appl. No.: 17/059,926

(22) PCT Filed: May 31, 2019

(86) PCT No.: PCT/JP2019/021727
§ 371 (c)(1),
(2) Date: Nov. 30, 2020

(87) PCT Pub. No.: WO2019/230951
PCT Pub. Date: Dec. 5, 2019

(65) Prior Publication Data
US 2021/0206967 A1    Jul. 8, 2021

(30) Foreign Application Priority Data

Jun. 1, 2018 (JP) ................. 2018-106277

(51) Int. Cl.
| | | |
|---|---|---|
| C08L 69/00 | (2006.01) | |
| C08G 64/04 | (2006.01) | |
| C08G 64/08 | (2006.01) | |
| C08G 64/10 | (2006.01) | |
| C08G 64/12 | (2006.01) | |
| C08G 64/14 | (2006.01) | |
| C08G 64/20 | (2006.01) | |
| C08G 64/24 | (2006.01) | |
| C08K 5/17 | (2006.01) | |
| C08L 27/18 | (2006.01) | |
| C08L 83/04 | (2006.01) | |

(52) U.S. Cl.
CPC ............ *C08L 69/00* (2013.01); *C08G 64/045* (2013.01); *C08G 64/081* (2013.01); *C08G 64/10* (2013.01); *C08G 64/12* (2013.01); *C08G 64/14* (2013.01); *C08G 64/20* (2013.01); *C08G 64/24* (2013.01); *C08K 5/17* (2013.01); *C08L 27/18* (2013.01); *C08L 83/04* (2013.01); *C08G 2261/148* (2013.01); *C08L 2201/02* (2013.01); *C08L 2201/08* (2013.01); *C08L 2201/10* (2013.01); *C08L 2205/02* (2013.01)

(58) Field of Classification Search
None
See application file for complete search history.

(56) References Cited

U.S. PATENT DOCUMENTS

| | | | | |
|---|---|---|---|---|
| 4,111,910 A | * | 9/1978 | Baggett ................. | C08G 64/14 528/196 |
| 4,973,664 A | * | 11/1990 | Silva ..................... | C08G 64/26 528/371 |
| 5,041,523 A | * | 8/1991 | Kuze ..................... | C08G 64/24 528/125 |
| 5,243,018 A | * | 9/1993 | Kuze ..................... | C08G 64/10 528/196 |
| 5,367,044 A | * | 11/1994 | Rosenquist ............ | C08G 64/14 528/196 |
| 2012/0123034 A1 | | 5/2012 | Morizur et al. | |

FOREIGN PATENT DOCUMENTS

| | | |
|---|---|---|
| CN | 1735646 A | 2/2006 |
| CN | 101128511 A | 2/2008 |
| CN | 104812796 A | 7/2015 |
| JP | S63-186732 A | 8/1988 |
| JP | H04-268328 A | 9/1992 |
| JP | 05214236 * | 8/1993 |
| JP | H06-56981 A | 3/1994 |
| JP | 2000-169696 A | 6/2000 |
| JP | 3129374 B2 | 1/2001 |
| JP | 2003226749 * | 8/2003 |
| JP | 2006-143949 A | 6/2006 |
| JP | 2015-108157 A | 6/2015 |
| WO | WO03029324 * | 4/2003 |
| WO | WO-2014/084327 A1 | 6/2014 |

OTHER PUBLICATIONS

VanDelinder, Simple, Benign, Aqueous-Based Amination of Polycarbonate Surfaces; Applied Materials & Interfaces (2015) 7,pp. 5643-5649. (Year: 2015).*
Compound Chem "Functional Groups in Organic Compounds" (2014) pp. 1-4. (Year: 2014).*
Office Action issued in corresponding Chinese Patent Application No. 201980036586.8 dated Jul. 20, 2022.
International Searching Authority, "International Search Report," issued in connection with International Patent Application No. PCT/JP2019/021727, dated Aug. 6, 2019.
International Searching Authority, "Written Opinion," issued in connection with International Patent Application No. PCT/JP2019/021727, dated Aug. 6, 2019.
Notice of Reasons for Refusal issued in corresponding Japanese Patent Application No. 2018-106277 dated May 31, 2022 (8 pages).
Notice of Reasons for Refusal issued in corresponding Japanese Patent Application No. 2018-106277 dated Mar. 1, 2022 (English translation included).
Office Action issued in corresponding Taiwanese Patent Application No. 108119083, dated Jun. 2, 2023.
Office Action issued in corresponding Korean Patent Application No. 10-2020-7034061 dated Jan. 23, 2024 (17 pages).

* cited by examiner

*Primary Examiner* — David J Buttner
(74) *Attorney, Agent, or Firm* — Foley & Lardner LLP

(57) ABSTRACT

Provided is a polycarbonate-based resin having a ratio of an amine terminal to all terminal groups of 1.0 mol % or more.

14 Claims, No Drawings

POLYCARBONATE-BASED RESIN, PRODUCTION METHOD THEREFOR, AND POLYCARBONATE-BASED RESIN COMPOSITION

CROSS-REFERENCE TO RELATED APPLICATIONS

The present application claims priority under 37 U.S.C. § 371 to International Patent Application No. PCT/JP2019/021727, filed May 31, 2019, which claims priority to and the benefit of Japanese Patent Application No. 2018-106277, filed on Jun. 1, 2018. The contents of these applications are hereby incorporated by reference in their entireties.

TECHNICAL FIELD

The present invention relates to a polycarbonate-based resin and a method of producing the resin, and a polycarbonate-based resin composition.

BACKGROUND ART

A polycarbonate-based resin is excellent in physical properties, such as heat resistance, impact resistance, and transparency, and hence has been widely utilized as an engineering plastic in various fields such as an OA equipment field, an electrical and electronic field, a mechanical part field, and an automotive field. In particular, a polycarbonate-based resin that has been made flame-retardant is suitably used as a part for OA and information equipment, such as a computer, a laptop-type or tablet-type personal computer, various mobile terminals, a printer, and a copying machine, and the like.

The US Underwriters Laboratory Standard (UL Standard) 94 is used as the level of the flame retardancy of the polycarbonate-based resin. The polycarbonate-based resin has a flame-retardant characteristic more excellent than the flame retardancy of a resin having transparency, such as an acrylic resin or a styrene resin. However, to obtain a high flame-retardant characteristic specified in the UL Standard, the polycarbonate-based resin needs to be prevented from dripping at the time of its combustion (Patent Document 1).

To improve the flame retardancy of the polycarbonate-based resin, for example, an attempt has been made to add a polytetrafluoroethylene that is a dripping inhibitor to the polycarbonate-based resin, to add a flame retardant as which organometallic salt compounds typified by an organic alkali metal salt compound and an organic alkaline earth metal salt compound are each useful to the polycarbonate-based resin, and/or to cause the polycarbonate-based resin to have a branched structure (Patent Documents 2 and 3).

CITATION LIST

Patent Document

Patent Document 1: JP 2000-169696 A
Patent Document 2: JP 2006-143949 A
Patent Document 3: JP 3129374 B2

SUMMARY OF INVENTION

Technical Problem

Although the method including adding the polytetrafluoroethylene to the polycarbonate-based resin is effective from the viewpoint of preventing its dripping, a required level of the flame retardancy of the resin is becoming even higher nowadays. Accordingly, another means for imparting flame retardancy has been required. Therefore, an object of the present invention is to provide a polycarbonate-based resin further improved in flame retardancy.

Solution to Problem

The inventors of the present invention have found that a polycarbonate-based resin having a specific amount of an amine terminal has more excellent flame retardancy. That is, the present invention relates to the following items [1] to [16].

[1] A polycarbonate-based resin having a ratio of an amine terminal to all terminal groups of 1.0 mol % or more.

[2] The polycarbonate-based resin according to Item [1], wherein the polycarbonate-based resin has the ratio of the amine terminal to all terminal groups of 20.0 mol % or less.

[3] The polycarbonate-based resin according to Item [1] or [2], wherein the polycarbonate-based resin has a repeating unit represented by the following general formula (II):

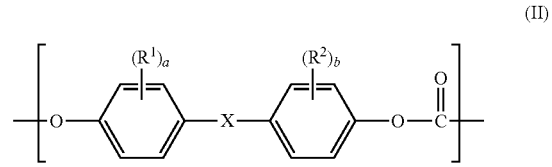

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4.

[4] The polycarbonate-based resin according to any one of Items [1] to [3], wherein the polycarbonate-based resin comprises 10 parts by mass to 100 parts by mass of a branched polycarbonate-based resin (A-1) and 0 parts by mass to 90 parts by mass of an aromatic polycarbonate-based resin (A-2) except the branched polycarbonate-based resin (A-1).

[5] The polycarbonate-based resin according to Item [4], wherein the branched polycarbonate-based resin (A-1) has a branched structure represented by the following general formula (I), and has a branching ratio of 0.3 mol % or more and 3.0 mol % or less:

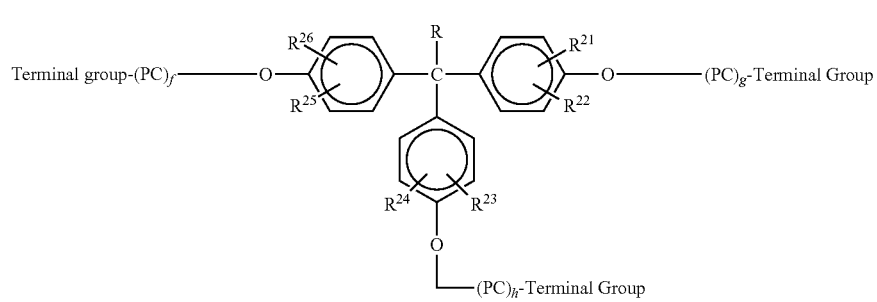

(I)

wherein R represents a hydrogen atom or an alkyl group having 1 to 5 carbon atoms, $R^{21}$ to $R^{26}$ each independently represent a hydrogen atom, an alkyl group having 1 to 5 carbon atoms, or a halogen atom, PC represents a polycarbonate moiety, and "f", "g", and "h" each represent an integer.

[6] The polycarbonate-based resin according to Item [5], wherein the branched structure represented by the general formula (I) is a structure derived from 1,1,1-tris(4-hydroxyphenyl)ethane.

[7] The polycarbonate-based resin according to any one of Items [1] to [6], wherein the polycarbonate-based resin has a viscosity-average molecular weight of 17,000 or more and 28,000 or less.

[8] A method of producing a polycarbonate-based resin, comprising:
a step (1) of causing a dihydric phenol and phosgene to react with each other in an organic solvent to produce a polycarbonate oligomer; and
a step (2) of causing the polycarbonate oligomer, the dihydric phenol, and a terminal stopper to react with each other to produce the polycarbonate-based resin,
the step (2) comprising using an amine-based catalyst as a polymerization catalyst at a molar ratio of 0.002 or more and 0.030 or less with respect to a chloroformate group of the polycarbonate oligomer obtained in the step (1).

[9] The method of producing a polycarbonate-based resin according to Item [8], further comprising adding a branching agent in the step (1) and/or the step (2) comprises.

[10] The method of producing a polycarbonate-based resin according to Item [9], wherein the branching agent has a structure represented by the following general formula (III):

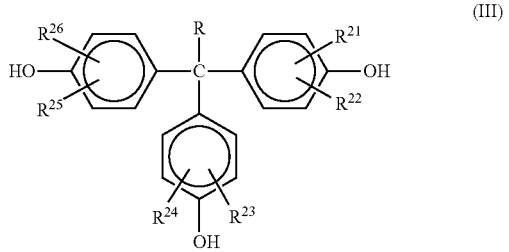

(III)

wherein R represents a hydrogen atom or an alkyl group having 1 to 5 carbon atoms, and $R^{21}$ to $R^{26}$ each independently represent a hydrogen atom, an alkyl group having 1 to 5 carbon atoms, or a halogen atom.

[11] The method of producing a polycarbonate-based resin according to Item [9] or [10], wherein the branching agent is further added in the step (2).

[12] The method of producing a polycarbonate-based resin according to Item or [11], wherein the branching agent represented by the general formula (III) is added at 0.3 mol % or more and 3.0 mol % or less with respect to a total number of moles of the dihydric phenol, the branching agent, and the terminal stopper added in the step (1) and the step (2).

[13] The method of producing a polycarbonate-based resin according to any one of Items to [12], wherein the branching agent represented by the general formula (III) is 1,1,1-tris(4-hydroxyphenyl)ethane.

[14] The method of producing a polycarbonate-based resin according to any one of Items [8] to [13], wherein the amine-based catalyst is a tertiary amine or a salt thereof.

[15] The method of producing a polycarbonate-based resin according to any one of Items [8] to [14], wherein the amine-based catalyst is triethylamine.

[16] A polycarbonate-based resin composition, comprising: the polycarbonate-based resin (A) of any one of Item [1] to [7]; and at least one selected from the group consisting of a flame retardant (B), a polyorganosiloxane (C), a polytetrafluoroethylene (D), and an antioxidant (E).

Advantageous Effects of Invention

According to the present invention, the polycarbonate-based resin having excellent flame retardancy can be obtained.

DESCRIPTION OF EMBODIMENTS

A polycarbonate-based resin, a method of producing the resin, and a polycarbonate-based resin composition of the present invention are each described in detail below. In this description, a provision considered to be preferred may be arbitrarily adopted, and a combination of preferred provisions is more preferred. The term "XX to YY" as used herein means "XX or more and YY or less."

<Polycarbonate-Based Resin>

As a first aspect of the present invention, the polycarbonate-based resin is described in detail.

In the polycarbonate-based resin of the present invention, the ratio of an amine terminal to all terminal groups is required to be 1.0 mol % or more. The polycarbonate-based resin may be any one of an aromatic polycarbonate-based resin and/or an aliphatic polycarbonate-based resin as long as the requirement is satisfied. Among them, however, the aromatic polycarbonate-based resin is preferred from the viewpoints of, for example, impact resistance, heat resistance, and flame retardancy. An aromatic polycarbonate-based resin produced by a reaction between a dihydric phenol and a carbonate precursor may be typically used as the aromatic polycarbonate-based resin.

The polycarbonate-based resin preferably has a repeating unit represented by the following general formula (II):

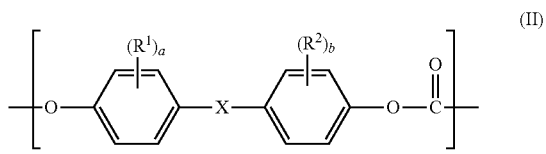

wherein $R^1$ and $R^2$ each independently represent a halogen atom, an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4.

In the general formula (II), examples of the halogen atom that $R^1$ and $R^2$ each independently represent include a fluorine atom, a chlorine atom, a bromine atom, and an iodine atom.

Examples of the alkyl group that $R^1$ and $R^2$ each independently represent include a methyl group, an ethyl group, a n-propyl group, an isopropyl group, various butyl groups (the term "various" means that a linear group and all kinds of branched groups are included, and in this description, the same holds true for the following), various pentyl groups, and various hexyl groups. Examples of the alkoxy group that $R^1$ and $R^2$ each independently represent include alkoxy groups having the above-mentioned alkyl groups as alkyl group moieties.

Examples of the alkylene group represented by X include a methylene group, an ethylene group, a trimethylene group, a tetramethylene group, and a hexamethylene group. Among them, an alkylene group having 1 to 5 carbon atoms is preferred. Examples of the alkylidene group represented by X include an ethylidene group and an isopropylidene group. Examples of the cycloalkylene group represented by X include a cyclopentanediyl group, a cyclohexanediyl group, and a cyclooctanediyl group. Among them, a cycloalkylene group having 5 to 10 carbon atoms is preferred. Examples of the cycloalkylidene group represented by X include a cyclohexylidene group, a 3,5,5-trimethylcyclohexylidene group, and a 2-adamantylidene group. Among them, a cycloalkylidene group having 5 to 10 carbon atoms is preferred, and a cycloalkylidene group having 5 to 8 carbon atoms is more preferred.

"a" and "b" each independently represent an integer of from 0 to 4, preferably from 0 to 2, more preferably 0 or 1.

Among them, a repeating unit in which "a" and "b" each represent 0, and X represents a single bond or an alkylene group having 1 to 8 carbon atoms, or a repeating unit in which "a" and "b" each represent 0, and X represents an alkylene group having 3 carbon atoms, in particular, an isopropylidene group is suitable.

The fact that the polycarbonate-based resin of the present invention "has an amine terminal" means that the resin has an amine structure as a terminal of part of its polycarbonate structure. To specifically give an example, the fact means that the resin has the following structure. The polycarbonate-based resin has, for example, a structure represented by the formula (i), which is derived from a terminal stopper to be described later, and the phrase "has an amine terminal" means that the resin has an amine terminal structure represented by the formula (ii) as the partial terminal. The presence of the amine terminal and the amount thereof may be recognized and calculated by nuclear magnetic resonance (NMR) measurement. Further details about the foregoing are described in Examples.

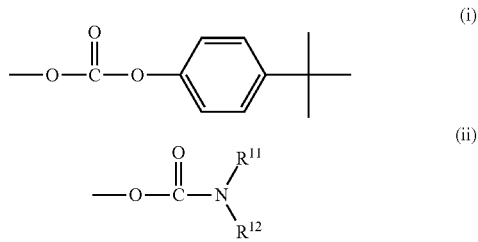

wherein $R^{11}$ and $R^{12}$ each independently represent a substituted or unsubstituted alkyl group having 1 to 6 carbon atoms, a substituted or unsubstituted cycloalkyl group having 5 to 8 carbon atoms, or a substituted or unsubstituted aryl group having 6 to 12 carbon atoms.

Examples of the alkyl group having 1 to 6 carbon atoms that is represented by any one of $R^{11}$ and $R^{12}$ may include a methyl group, an ethyl group, a butyl group, and a propyl group. The cycloalkyl group having 5 to 8 carbon atoms that is represented by any one of $R^{11}$ and $R^{12}$ may be, for example, a cyclohexyl group. The aryl group having 6 to 12 carbon atoms that is represented by any one of $R^{11}$ and $R^{12}$ may be, for example, a phenyl group. An amine terminal in which both of $R^{11}$ and $R^{12}$ represent ethyl groups among them is particularly preferred.

As described above, the polycarbonate-based resin of the present invention is required to include 1.0 mol % or more of the above-mentioned amine terminal with respect to all the terminal groups. When the amine terminal amount is less than 1.0 mol %, the resin is poor in flame retardancy.

The amine terminal amount with respect to all the terminal groups in the polycarbonate-based resin of the present invention is preferably 2.0 mol % or more, more preferably 3.0 mol % or more, still more preferably 4.0 mol % or more, and is preferably 20.0 mol % or less, more preferably 10.0 mol % or less, still more preferably 7.0 mol % or less, particularly preferably 5.0 mol % or less. When the amine terminal amount falls within the range of 20.0 mol % or less, satisfactory flame retardancy is obtained.

The polycarbonate-based resin of the present invention preferably has a viscosity-average molecular weight (Mv) of 17,000 or more and 28,000 or less. The viscosity-average molecular weight may be adjusted by using, for example, a molecular weight modifier (terminal stopper), or in accordance with a reaction condition. The setting of the viscosity-average molecular weight within the range can provide a polycarbonate-based resin more excellent in flame retardancy.

The viscosity-average molecular weight (Mv) is more preferably 19,000 or more, still more preferably 20,000 or more. From the viewpoint of moldability, the upper limit value thereof is more preferably 27,500 or less, still more preferably 26,000 or less, still more preferably 25,500 or less, particularly preferably 22,500 or less.

The viscosity-average molecular weight (Mv) is a value calculated from the following Schnell's equation by measuring the limiting viscosity [4] of a methylene chloride solution at 20° C.

$$[\eta]=1.23\times10^{-5}-Mv^{0.83}$$

More specifically, it is more preferred that the polycarbonate-based resin of the present invention include 10 parts by mass to 100 parts by mass of a branched polycarbonate-based resin (A-1) and 0 parts by mass to 90 parts by mass of an aromatic polycarbonate-based resin (A-2) except the branched polycarbonate-based resin (A-1). The amount of the branched polycarbonate-based resin (A-1) is more preferably from 30 parts by mass to 100 parts by mass, still more preferably from 40 parts by mass to 100 parts by mass, and the amount of the aromatic polycarbonate-based resin (A-2) is more preferably from 0 parts by mass to 70 parts by mass, still more preferably from 0 parts by mass to 60 parts by mass. The incorporation of the branched polycarbonate-based resin (A-1) in an amount within the ranges can further improve the flame retardancy of the polycarbonate-based resin.

<Branched Polycarbonate-Based Resin (A-1)>

The branched polycarbonate-based resin (A-1) is not particularly limited as long as the resin is a branched polycarbonate-based resin. The resin may be, for example, a resin having a repeating unit represented by the above-mentioned general formula (II) and having a branched structure represented by the following general formula (I).

It is preferred that the branched polycarbonate-based resin (A-1) have the branched structure represented by the general formula (I), and have a branching ratio of 0.3 mol % or more and 3.0 mol % or less. When the branching ratio of the branched polycarbonate-based resin (A-1) falls within the range, the flame retardancy of the polycarbonate-based resin of the present invention can be further improved. The term "branching ratio" as used herein means the ratio of the number of moles of a structural unit derived from the branching agent to the total number of moles of a structural unit derived from the dihydric phenol, the structural unit derived from the branching agent being used in the production of the branched polycarbonate-based resin (A-1), and a terminal unit (number of moles of structural unit derived from branching agent/total number of moles of (structural unit derived from dihydric phenol+structural unit derived from branching agent+terminal unit)×100 (represented in the unit of mol %)). The branching ratio may be actually measured by $^1$H-NMR measurement.

When the branching agent to be described later is added at 0.3 mol % or more and 3.0 mol % or less with respect to the total number of moles of the dihydric phenol, the branching agent, and a terminal stopper, which are raw materials for the branched polycarbonate-based resin (A-1), at the time of the production of the polycarbonate-based resin, a branched polycarbonate-based resin having a branching ratio in the above-mentioned range can be obtained.

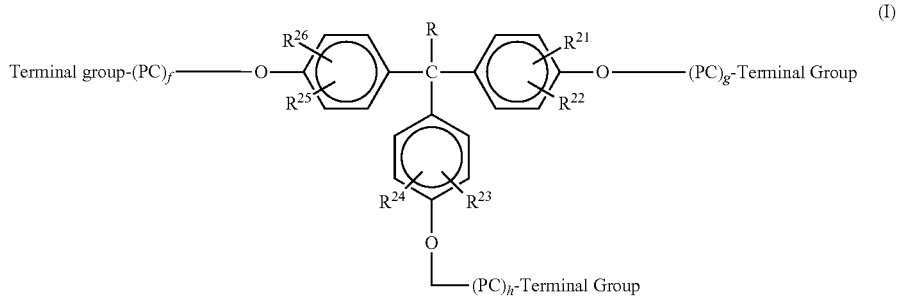

(I)

wherein R represents a hydrogen atom or an alkyl group having 1 to 5 carbon atoms, $R^{21}$ to $R^{26}$ each independently represent a hydrogen atom, an alkyl group having 1 to 5 carbon atoms, or a halogen atom, PC represents a polycarbonate moiety, and "f", "g", and "h" each represent an integer.

The polycarbonate moiety represented by PC in the formula (I) has a repeating unit represented by the above-mentioned general formula (II), and the repeating unit is specifically, for example, a repeating unit derived from bisphenol A that is represented by the following formula (IV). A branching agent and a raw material dihydric phenol to be used at the time of the production of the branched polycarbonate-based resin (A-1) are described later.

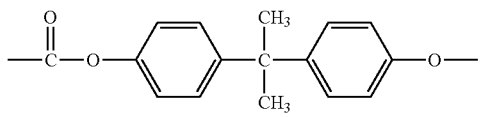

(IV)

From the viewpoint of obtaining more excellent flame retardancy, the branching ratio of the branched polycarbonate-based resin (A-1) is more preferably 0.5 mol % or more, still more preferably 1.0 mol % or more, still more preferably 1.2 mol % or more, still more preferably 1.4 mol % or more, particularly preferably 1.5 mol % or more. From the viewpoint of obtaining more satisfactory physical properties, the branching ratio of the branched polycarbonate-based resin (A-1) is more preferably 2.5 mol % or less, still more preferably 2.3 mol % or less, still more preferably 2.0 mol % or less. A branched nucleus structure may be derived from a single branching agent, or may be derived from two or more of branching agents. The branched structure represented by the general formula (I) more preferably has a branched structure that is a structure derived from 1,1,1-tris(4-hydroxyphenyl)ethane among such branching agents.

<Aromatic Polycarbonate-Based Resin (A-2)>

The aromatic polycarbonate-based resin (A-2) is an unbranched polycarbonate-based resin except the branched polycarbonate-based resin (A-1), and as described above, preferably has a repeating unit represented by the general formula (II):

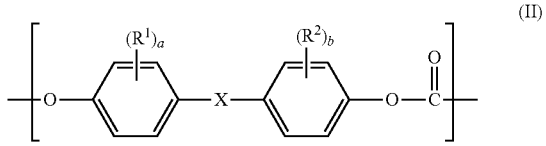

(II)

wherein $R^1$, $R^2$, X, "a", and "b" are as described above.

Among such resins, a resin in which "a" and "b" each represent 0, and X represents a single bond or an alkylene group having 1 to 8 carbon atoms, or a resin in which "a" and "b" each represent 0, and X represents an alkylidene group, in particular, an isopropylidene group is suitable. The polycarbonate-based resin of the present invention may include a plurality of kinds of polycarbonate blocks as the aromatic polycarbonate-based resins (A-2).

When the polycarbonate-based resin includes the plurality of kinds of polycarbonate blocks as the aromatic polycarbonate-based resins (A-2), the content of a resin in which "a" and "b" each represent 0, and X represents an isopropylidene group is preferably 90 mass % or more, more preferably 90.9 mass % or more, still more preferably 93.3 mass % or more, particularly preferably 95 mass % or more, most preferably 100 mass % from the viewpoint of the transparency of the polycarbonate-based resin.

<Method of Producing Polycarbonate-Based Resin>

Next, as a second aspect of the present invention, the method of producing a polycarbonate-based resin is described in detail.

A method of producing a polycarbonate-based resin of the present invention includes: a step (1) of causing a dihydric phenol and phosgene to react with each other in an organic solvent to produce a polycarbonate oligomer; and a step (2) of causing the polycarbonate oligomer, the dihydric phenol, and a terminal stopper to react with each other to produce the polycarbonate-based resin, the step (2) including using an amine-based catalyst as a polymerization catalyst at a molar ratio of 0.002 or more and 0.030 or less with respect to a chloroformate group of the polycarbonate oligomer obtained in the step (1).

An example of the organic solvent is a solvent that can dissolve the polycarbonate-based resin. Specific examples thereof include halogenated hydrocarbon solvents, such as dichloromethane (methylene chloride), dichloroethane, trichloroethane, tetrachloroethane, pentachloroethane, hexachloroethane, dichloroethylene, chlorobenzene, and dichlorobenzene. Among them, methylene chloride is particularly preferred.

<Step (1)>

In this step, the dihydric phenol and phosgene are caused to react with each other in the organic solvent to produce the polycarbonate oligomer having a chloroformate group.

A compound represented by the following general formula (iii) is preferably used as the dihydric phenol:

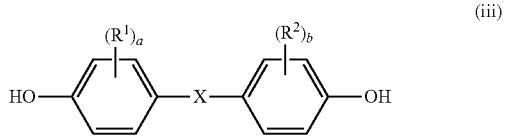

(iii)

wherein $R^1$, $R^2$, "a", "b", and X are as described above.

Examples of the dihydric phenol represented by the general formula (iii) include: bis(hydroxyphenyl)alkane-based dihydric phenols, such as 2,2-bis(4-hydroxyphenyl)propane [bisphenol A], bis(4-hydroxyphenyl)methane, 1,1-bis(4-hydroxyphenyl)ethane, and 2,2-bis(4-hydroxy-3,5-dimethylphenyl)propane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; and bis(4-hydroxyphenyl) ketone. Those dihydric phenols may be used alone or as a mixture thereof.

Among them, bis(hydroxyphenyl)alkane-based dihydric phenols are preferred, and bisphenol A is more preferred. When bisphenol A is used as the dihydric phenol, the polycarbonate-based resin is such that in the general formula (II), X represents an isopropylidene group and a=b=0.

Examples of the dihydric phenol except bisphenol A include bis(hydroxyaryl)alkanes, bis(hydroxyaryl)cycloalkanes, dihydroxyaryl ethers, dihydroxydiaryl sulfides, dihydroxydiaryl sulfoxides, dihydroxydiaryl sulfones, dihydroxydiphenyls, dihydroxydiaryl fluorenes, and dihydroxydiaryl adamantanes. Those dihydric phenols may be used alone or as a mixture thereof.

Examples of the bis(hydroxyaryl)alkanes include bis(4-hydroxyphenyl)methane, 1,1-bis(4-hydroxyphenyl)ethane, 2,2-bis(4-hydroxyphenyl)butane, 2,2-bis(4-hydroxyphenyl)octane, bis(4-hydroxyphenyl)phenylmethane, bis(4-hydroxyphenyl)diphenylmethane, 2,2-bis(4-hydroxy-3-methylphenyl)propane, bis(4-hydroxyphenyl)naphthylmethane, 1,1-bis(4-hydroxy-3-tert-butylphenyl)propane, 2,2-bis(4-hydroxy-3-bromophenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, and 2,2-bis(4-hydroxy-3,5-dibromophenyl)propane.

Examples of the bis(hydroxyaryl)cycloalkanes include 1,1-bis(4-hydroxyphenyl)cyclopentane, 1,1-bis(4-hydroxyphenyl)cyclohexane, 1,1-bis(4-hydroxyphenyl)-3,5,5-trimethylcyclohexane, 2,2-bis(4-hydroxyphenyl)norbornane, and 1,1-bis(4-hydroxyphenyl)cyclododecane. Examples of the dihydroxyaryl ethers include 4,4'-dihydroxydiphenyl ether and 4,4'-dihydroxy-3,3'-dimethylphenyl ether.

Examples of the dihydroxydiaryl sulfides include 4,4'-dihydroxydiphenyl sulfide and 4,4'-dihydroxy-3,3'-dimethyldiphenyl sulfide. Examples of the dihydroxydiaryl sulfoxides include 4,4'-dihydroxydiphenyl sulfoxide and 4,4'-dihydroxy-3,3'-dimethyldiphenyl sulfoxide. Examples of the dihydroxydiaryl sulfones include 4,4'-dihydroxydiphenyl sulfone and 4,4'-dihydroxy-3,3'-dimethyldiphenyl sulfone.

An example of the dihydroxydiphenyls is 4,4'-dihydroxydiphenyl. Examples of the dihydroxydiarylfluorenes include 9,9-bis(4-hydroxyphenyl)fluorene and 9,9-bis(4-hydroxy-3-methylphenyl)fluorene. Examples of the dihydroxydiaryladamantanes include 1,3-bis(4-hydroxyphenyl)adamantane, 2,2-bis(4-hydroxyphenyl)adamantane, and 1,3-bis(4-hydroxyphenyl)-5,7-dimethyladamantane.

Examples of dihydric phenols except those described above include 4,4'-[1,3-phenylenebis(1-methylethylidene)]bisphenol, 10,10-bis(4-hydroxyphenyl)-9-anthrone, and 1,5-bis(4-hydroxyphenylthio)-2,3-dioxapentane.

Phosgene is a compound that is typically obtained by causing chlorine and carbon monoxide to react with each other at the following ratio through use of activated carbon as a catalyst: 1.01 mol to 1.3 mol of carbon monoxide is used with respect to 1 mol of chlorine. When phosgene to be used is used as a phosgene gas, a phosgene gas containing about 1 vol % to about 30 vol % of unreacted carbon monoxide may be used. Phosgene in a liquefied state may also be used.

To produce the polycarbonate oligomer in the step (1), an aqueous alkali solution of the dihydric phenol, phosgene, and the organic solvent are introduced into a reactor, and the dihydric phenol and phosgene are caused to react with each other. The usage amount of the organic solvent is desirably selected so that a volume ratio between an organic solvent phase and an aqueous phase may be from 5/1 to 1/7, preferably from 2/1 to 1/4. In the reactor, heat is generated by a reaction in which a terminal group of the dihydric phenol is turned into a chloroformate by phosgene, and a reaction in which phosgene is decomposed by an alkali, and hence the temperature of a reaction product increases. Therefore, the reaction product is preferably cooled so that its temperature may be from 0° C. to 50° C., more preferably from 5° C. to 40° C. Phosgene is preferably used so that the usage amount of phosgene may be from 1.1 mol to 1.5 mol with respect to 1 mol of the dihydric phenol, that is, may be excess. A reaction liquid obtained after the reaction is separated into an aqueous phase and an organic phase. Thus, the organic phase containing the polycarbonate oligomer is obtained. The weight-average molecular weight of the resultant polycarbonate oligomer is typically 5,000 or less, and the degree of polymerization thereof is typically 20 or less, preferably from 2 to 10.

At the time of the production of the polycarbonate oligomer, the amine-based polymerization catalyst to be used in the subsequent step (2) may be used for accelerating the reaction. A terminal stopper to be used as a molecular weight modifier for a polycarbonate may be used. Examples of a compound to be used as the terminal terminator may include monohydric phenols, such as phenol, p-cresol, p-tert-butylphenol, p-tert-octylphenol, p-cumylphenol, 3-pentadecylphenol, bromophenol, tribromophenol, and nonylphenol. Among them, p-tert-butylphenol, p-cumylphenol, and phenol are preferred in terms of, for example, economical efficiency and ease of availability. In addition, the use of 3-pentadecylphenol can largely improve the fluidity of the polycarbonate oligomer to be obtained.

The reactor to be used at the time of the production of the polycarbonate oligomer is preferably a stationary mixer, that is, a static mixer. The stationary mixer is preferably a tubular reactor including, in itself, an element having an action of dividing, turning, and reversing a fluid. When a vessel-type stirring vessel including a stirring machine is further used after the stationary mixer, oligomerization can be accelerated. Accordingly, such reactors are preferably used in combination.

A reaction mixed liquid containing the polycarbonate oligomer having a chloroformate group is obtained through the step (1). The reaction mixed liquid is separated into an organic phase containing the polycarbonate oligomer and an aqueous phase by using a separation method, such as settling, and the organic phase containing polycarbonate oligomer is used in the step (2) to be described later.

<Step (2)>

In the step (2), the polycarbonate oligomer obtained in the step (1), the dihydric phenol, and the terminal stopper are caused to react with each other to produce the polycarbonate-based resin.

In the step (2), the polycarbonate oligomer and the dihydric phenol are subjected to a polycondensation reaction so that the molecular weight of a reaction product may be adjusted within a target molecular weight range. The polycondensation reaction is performed until the viscosity-average molecular weight of the polycarbonate-based resin to be obtained falls within the above-mentioned range.

Specifically, the organic solvent phase containing the polycarbonate oligomer that has been separated in the step (1), the terminal stopper to be used if desired, the polymerization catalyst to be used if desired, an organic solvent, an aqueous alkali solution, and an aqueous alkali solution of the dihydric phenol are mixed, and the mixture is subjected to interfacial polycondensation at a temperature in the range of typically from 0° C. to 50° C., preferably from 20° C. to 40° C.

Examples of the alkali of each of the aqueous alkali solutions, the organic solvent, and the terminal stopper to be used in this step may include the same examples as those described for the step (1). The usage amount of the organic solvent in the step (2) is typically selected so that a volume ratio between the organic phase and aqueous phase of a reaction liquid to be obtained may be preferably from 7/1 to 1/1, more preferably from 5/1 to 2/1.

With regard to a reactor to be used in the step (2), the reaction can be completed with only one reactor depending on the processing capacity of the reactor. However, a plurality of reactors such as a second reactor and a third reactor subsequent to the first reactor may be used as required. For example, a stirring vessel, a multistage column-type stirring vessel, a non-stirring vessel, a static mixer, a line mixer, an orifice mixer, and/or piping may be used as any such reactor.

The resultant reaction liquid is subjected to oil-water separation because the reaction liquid includes the organic solvent phase containing the polycarbonate-based resin and the aqueous phase containing an unreacted dihydric phenol. An apparatus for the separation may be, for example, a settling vessel or a centrifugal separator. The separated organic solvent phase containing the polycarbonate-based resin is subjected to alkali washing, acid washing, and pure water washing in the stated order to provide an organic solvent phase containing the purified polycarbonate-based resin. The organic solvent phase containing the purified polycarbonate-based resin is concentrated as required, and is then subjected to a kneader treatment, warm water granulation, or the like. Thus, the powder of the polycarbonate-based resin can be obtained. The organic solvent remains in the resultant powder of the polycarbonate-based resin, and hence the performance of a drying treatment, such as a heating treatment, can provide polycarbonate-based resin powder from which the organic solvent has been removed. The resultant polycarbonate-based resin powder may be pelletized with a pelletizer or the like to provide various molded bodies.

<Branching Agent>

The branched polycarbonate-based resin (A-1) can be produced by adding an arbitrary branching agent. The aromatic polycarbonate-based resin (A-2) can be produced by adding no branching agent. The branching agent may be added in the step (1) and/or the step (2). When the branching agent is added in the step (1), the branching agent is added together with the dihydric phenol and phosgene, and the materials are caused to react with each other. A branching agent represented by the general formula (III) to be described later can be dissolved in an aqueous alkali solution, and is hence desirably introduced after having been dissolved in the aqueous alkali solution, though whether or not the dissolution should be performed varies depending on the branching agent to be used. In addition, a branching agent that is hardly dissolved in an aqueous alkali solution is desirably introduced after having been dissolved in an organic solvent, such as methylene chloride.

The branching agent may be added in any one of the step (1) and the step (2), or in both of the steps (1) and (2). The branching agent may be further added in the step (2). It is preferred that the branching agent be finally added in an addition amount of 0.3 mol % or more and 3.0 mol % or less with respect to the total number of moles of the dihydric phenol, the branching agent, and the terminal stopper that are raw materials in terms of total amount of the branching agent to be added in the step (1) and the step (2). The adoption of the addition amount can provide the branched polycarbonate-based resin (A-1) having the above-mentioned preferred branching ratio. The addition amount of the branching agent with respect to the total number of moles of the dihydric phenol, the branching agent, and the terminal stopper is more preferably 0.5 mol % or more, still more preferably 1.0 mol % or more, still more preferably 1.2 mol % or more, still more preferably 1.4 mol % or more, particularly preferably 1.5 mol % or more from the viewpoint of obtaining more excellent flame retardancy, and is more preferably 2.5 mol % or less, still more preferably 2.3 mol % or less, still more preferably 2.0 mol % or less from the viewpoint of obtaining more satisfactory physical properties. The setting of the addition amount of the branching agent within the ranges can provide more excellent flame retardancy.

Specifically, a branching agent represented by the following general formula (III) is used at the time of the production of the branched polycarbonate-based resin represented by the general formula (I):

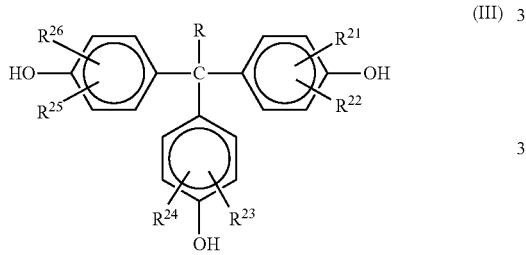

(III)

wherein R represents a hydrogen atom or an alkyl group having 1 to 5 carbon atoms, and $R^{21}$ to $R^{26}$ each independently represent a hydrogen atom, an alkyl group having 1 to 5 carbon atoms, or a halogen atom.

The branching agent represented by the general formula (III) is described in more detail.

Examples of the alkyl group having 1 to 5 carbon atoms that is represented by R include a methyl group, an ethyl group, a n-propyl group, a n-butyl group, and a n-pentyl group. Examples of the alkyl group having 1 to 5 carbon atoms that is represented by any one of $R^{21}$ to $R^{26}$ may include a methyl group, an ethyl group, a n-propyl group, a n-butyl group, and a n-pentyl group, and examples of the halogen atom may include a chlorine atom, a bromine atom, and a fluorine atom.

More specific examples of the branching agent represented by the general formula (III) include compounds each having 3 or more functional groups, such as: 1,1,1-tris(4-hydroxyphenyl)methane; 1,1,1-tris(4-hydroxyphenyl)ethane; 1,1,1-tris(4-hydroxyphenyl)propane; 1,1,1-tris(2-methyl-4-hydroxyphenyl)methane; 1,1,1-tris(2-methyl-4-hydroxyphenyl)ethane; 1,1,1-tris(3-methyl-4-hydroxyphenyl)methane; 1,1,1-tris(3-methyl-4-hydroxyphenyl)ethane; 1,1,1-tris(3,5-dimethyl-4-hydroxyphenyl)methane; 1,1,1-tris(3,5-dimethyl-4-hydroxyphenyl)ethane; 1,1,1-tris(3-chloro-4-hydroxyphenyl)methane; 1,1,1-tris(3-chloro-4-hydroxyphenyl)ethane; 1,1,1-tris(3,5-dichloro-4-hydro- xyphenyl)methane; 1,1,1-tris(3,5-dichloro-4-hydroxyphenyl)ethane; 1,1,1-tris(3-bromo-4-hydroxyphenyl)methane; 1,1,1-tris(3-bromo-4-hydroxyphenyl)ethane; 1,1,1-tris(3,5-dibromo-4-hydroxyphenyl)methane; 1,1,1-tris(3,5-dibromo-4-hydroxyphenyl)ethane; 4,4'-[1-[4-[1-(4-hydroxyphenyl)-1-methylethyl]phenyl]ethylidene]bisphenol; α,α',α''-tris(4-hydroxyphenyl)-1,3,5-triisopropylbenzene; 1-[α-methyl-α-(4'-hydroxyphenyl)ethyl]-4-[α',α'-bis(4''-hydroxyphenyl)ethyl]benzene; and phloroglucin, trimellitic acid, and isatinbis(o-cresol). Among those described above, 1,1,1-tris(4-hydroxyphenyl)ethane (hereinafter sometimes abbreviated as "THPE") is preferably used from the viewpoints of availability, reactivity, and economical efficiency.

<Polymerization Catalyst>

The polymerization catalyst may be used in any of the step (1) and the step (2), and the amine-based catalyst is used in the present invention.

As the amine-based catalyst, a tertiary amine or a salt thereof, or a quaternary ammonium salt may be used. Examples of the tertiary amine include triethylamine, tributylamine, N,N-dimethylcyclohexylamine, pyridine, and dimethylaniline, and examples of the tertiary amine salt include hydrochloric acid salts and bromic acid salts of those tertiary amines. Examples of the quaternary ammonium salt may include trimethylbenzylammonium chloride, triethylbenzylammonium chloride, tributylbenzylammonium chloride, trioctylmethylammonium chloride, tetrabutylammonium chloride, and tetrabutylammonium bromide. As the amine-based catalyst, a tertiary amine is preferred, and triethylamine is particularly suitable. Each of those catalysts may be introduced as it is or after having been dissolved in an organic solvent or water when the catalyst is in a liquid state. In addition, a catalyst in a solid state may be introduced after having been dissolved in an organic solvent or water.

When the polymerization catalyst is used in the step (2), the catalyst is used at a molar ratio of 0.002 or more and 0.030 or less with respect to a chloroformate group of the polycarbonate oligomer obtained in the step (1). When the amount of the polymerization catalyst to be added in the step (2) falls within the range, the flame retardancy of the polycarbonate-based resin to be obtained can be improved. Although the addition amount is an amount much larger than a typical catalyst addition amount, the inventors of the present invention have found that the setting of the polymerization catalyst amount in the step (2) within the range can improve the flame retardancy of the polycarbonate-based resin to be obtained.

The amount of the polymerization catalyst to be added in the step (2) is more preferably 0.004 or more, still more preferably 0.006 or more, still more preferably 0.010 or more, still more preferably 0.015 or more in terms of molar ratio with respect to a chloroformate group of the polycarbonate oligomer, and is more preferably 0.025 or less, still more preferably 0.020 or less.

<Polycarbonate-Based Resin Composition>

As a third aspect of the present invention, there can be obtained a polycarbonate-based resin composition, including: the polycarbonate-based resin (A); and at least one selected from the group consisting of a flame retardant (B), a polyorganosiloxane (C), a polytetrafluoroethylene (D), and an antioxidant (E).

The polycarbonate-based resin described in detail in the first aspect and second aspect of the present invention is used as the polycarbonate-based resin (A).

<Flame Retardant (B)>

The polycarbonate-based resin composition of the present invention may be blended with the flame retardant for further improving its flame retardancy.

The flame retardant is not particularly limited, and a known flame retardant may be used. Specific examples thereof may include an organic alkali metal salt and an organic alkaline earth metal salt. Those salts may be used alone or in combination thereof. The flame retardant (B) is preferably any one of the organic alkali metal salt and the organic alkaline earth metal salt.

Examples of the organic sulfonic acid salt of the alkali metal or alkaline earth metal (hereinafter sometimes collectively referred to as "alkali(ne earth) metal") include: a metal salt of a fluorine-substituted alkyl sulfonic acid, such as a metal salt of a perfluoroalkane sulfonic acid and an alkali metal or an alkaline earth metal; and a metal salt of an aromatic sulfonic acid and an alkali metal or an alkaline earth metal.

Examples of the alkali metal include lithium, sodium, potassium, rubidium, and cesium. Examples of the alkaline earth metal include beryllium, magnesium, calcium, strontium, and barium. Among them, an alkali metal is more preferred.

Among those alkali metals, potassium and sodium are preferred, and potassium is particularly preferred from the viewpoints of flame retardancy and thermal stability.

A potassium salt and a sulfonic acid alkali metal salt formed of another alkali metal may be used in combination.

Specific examples of the perfluoroalkane sulfonic acid alkali metal salt include potassium perfluorobutane sulfonate, potassium trifluoromethane sulfonate, potassium perfluorohexane sulfonate, potassium perfluorooctane sulfonate, sodium pentafluoroethane sulfonate, sodium perfluorobutane sulfonate, sodium perfluorooctane sulfonate, lithium trifluoromethane sulfonate, lithium perfluorobutane sulfonate, lithium perfluoroheptane sulfonate, cesium trifluoromethane sulfonate, cesium perfluorobutane sulfonate, cesium perfluorooctane sulfonate, cesium perfluorohexane sulfonate, rubidium perfluorobutane sulfonate, and rubidium perfluorohexane sulfonate. The perfluoroalkane sulfonic acid alkali metal salts may be used alone or in combination thereof.

The number of carbon atoms of the perfluoroalkyl group is preferably from 1 to 18, more preferably from 1 to 10, still more preferably from 1 to 8.

Among them, potassium perfluorobutane sulfonate is particularly preferred.

Specific examples of the aromatic sulfonic acid alkali(ne earth) metal salt include disodium diphenyl sulfide-4,4'-disulfonate, dipotassium diphenyl sulfide-4,4'-disulfonate, potassium 5-sulfoisophthalate, sodium 5-sulfoisophthalate, polysodium polyethylene terephthalate polysulfonate, calcium 1-methoxynaphthalene-4-sulfonate, disodium 4-dodecyl phenyl ether disulfonate, polysodium poly(2,6-dimethylphenylene oxide) polysulfonate, polysodium poly(1,3-phenylene oxide) polysulfonate, polysodium poly(1,4-phenylene oxide) polysulfonate, polypotassium poly(2,6-diphenylphenylene oxide) polysulfonate, lithium poly(2-fluoro-6-butylphenylene oxide) polysulfonate, potassium benzenesulfonate, sodium benzenesulfonate, sodium p-toluenesulfonate, strontium benzenesulfonate, magnesium benzenesulfonate, dipotassium p-benzenedisulfonate, dipotassium naphthalene-2,6-disulfonate, calcium biphenyl-3,3'-disulfonate, sodium diphenyl sulfone-3-sulfonate, potassium diphenyl sulfone-3-sulfonate, dipotassium diphenyl sulfone-3,3'-disulfonate, dipotassium diphenyl sulfone-3,4'-disulfonate, sodium α,α,α-trifluoroacetophenone-4-sulfonate, dipotassium benzophenone-3,3'-disulfonate, disodium thiophene-2,5-disulfonate, dipotassium thiophene-2,5-disulfonate, calcium thiophene-2,5-disulfonate, sodium benzothiophene sulfonate, potassium diphenyl sulfoxide-4-sulfonate, a formalin condensate of sodium naphthalenesulfonate, and a formalin condensate of sodium anthracenesulfonate.

Among those aromatic sulfonic acid alkali(ne earth) metal salts, a sodium salt and a potassium salt are particularly suitable.

The content of the flame retardant (B) in the polycarbonate-based resin composition of the present invention is preferably from 0.001 part by mass to 1 part by mass, more preferably from 0.01 part by mass to 0.1 part by mass, still more preferably from 0.02 part by mass to 0.08 part by mass with respect to 100 parts by mass of the polycarbonate-based resin (A). When the content is 0.001 part by mass or more, sufficient flame retardancy is obtained, and when the content is 1 part by mass or less, the contamination of a mold can be suppressed.

<Polyorganosiloxane (C)>

The polycarbonate-based resin composition of the present invention may include the polyorganosiloxane (C). The polyorganosiloxane (C) is preferred in terms of the maintenance of the characteristics of a molded article of the composition, such as mechanical strength, stability, and heat resistance.

The polyorganosiloxane (C) is not particularly limited, and examples thereof include an alkyl hydrogen silicone and an alkoxy silicone. Examples of the alkyl hydrogen silicone may include methyl hydrogen silicone and ethyl hydrogen silicone, and examples of the alkoxy silicone may include methoxy silicone and ethoxy silicone.

Among them, the alkoxysilicone may be particularly preferably used as the polyorganosiloxane (C). The alkoxysilicone is specifically a silicone compound containing an alkoxysilyl group in which an alkoxy group is bonded to a silicon atom directly or through a divalent hydrocarbon group. Examples thereof include a linear polyorganosiloxane, a cyclic polyorganosiloxane, a network polyorganosiloxane, and a linear polyorganosiloxane having a partial branch. Among them, the linear polyorganosiloxane is particularly preferred. More specifically, a polyorganosiloxane having such a molecular structure that an alkoxy group is bonded to its silicone main chain through a methylene chain is preferred.

As the polyorganosiloxane (C), for example, commercial products such as SH1107, SR2402, BY16-160, BY16-161, BY16-160E, and BY16-161E manufactured by Dow Corning Toray Co., Ltd., and KR511 manufactured by Shin-Etsu Chemical Co., Ltd. may be suitably used.

The content of the polyorganosiloxane (C) in the polycarbonate-based resin composition of the present invention is preferably from 0.05 part by mass to 0.30 part by mass, more preferably from 0.05 part by mass to 0.20 part by mass, still more preferably from 0.07 part by mass to 0.15 part by mass with respect to 100 parts by mass of the polycarbonate-based resin (A). When the content is 0.05 part by mass or more, the deterioration of the polycarbonate-based resin hardly occurs, and hence a reduction in molecular weight of the resin can be suppressed. When the content is 0.30 part by mass or less, economical efficiency is well-balanced. In addition, silver or the like does not occur on the surface of a molded article of the composition, and hence the appearance of the molded article can be satisfactorily maintained.

<Polytetrafluoroethylene (D)>

The polycarbonate-based resin composition of the present invention may be blended with the polytetrafluoroethylene (D) for improving its anti-dripping effect and flame retardancy.

The polytetrafluoroethylene (D) is not particularly limited, and a known polytetrafluoroethylene may be used. However, an aqueous dispersion-type polytetrafluoroethylene or an acryl-coated polytetrafluoroethylene is preferred. The use of the aqueous dispersion-type or acryl-coated polytetrafluoroethylene can suppress an appearance failure. For example, when a certain amount of a powdery polytetrafluoroethylene is used, there is a risk in that the polytetrafluoroethylene aggregates to form an aggregate, and the aggregate impairs the appearance of the molded article.

The content of the polytetrafluoroethylene (D) in the polycarbonate-based resin composition of the present invention is preferably 0 parts by mass or more and 0.5 part by mass or less, more preferably 0 parts by mass or more and 0.3 part by mass or less with respect to 100 parts by mass of the polycarbonate-based resin (A). When the content falls within the ranges, the production of the aggregate of the polytetrafluoroethylene can be further suppressed.

<Antioxidant (E)>

The polycarbonate-based resin composition of the present invention may include the antioxidant as required. A known antioxidant may be used as the antioxidant, and a phenol-based antioxidant and a phosphorus-based antioxidant may be preferably used. The antioxidants may be used alone or in combination thereof.

Examples of the phenol-based antioxidant include triethylene glycol-bis[3-(3-tert-butyl-5-methyl-4-hydroxyphenyl) propionate], 1,6-hexanediol-bis[3-(3,5-di-tert-butyl-4-hydroxyphenyl)propionate], pentaerythritol-tetrakis[3-(3,5-di-tert-butyl-4-hydroxyphenyl)propionate], octadecyl-3-(3,5-di-tert-butyl-4-hydroxyphenyl)propionate, 1,3,5-trimethyl-2,4,6-tris(3,5-di-tert-butyl-4-hydroxybenzyl)benzene, N,N-hexamethylenebis(3,5-di-tert-butyl-4-hydroxy-hydrocinnamide), 3,5-di-tert-butyl-4-hydroxy-benzylphosphonate diethyl ester, tris(3,5-di-tert-butyl-4-hydroxybenzyl)isocyanurate, and 3,9-bis[1,1-dimethyl-2-[β-(3-tert-butyl-4-hydroxy-5-methylphenyl)propionyloxy]et hyl]-2,4,8,10-tetraoxaspiro(5,5)undecane.

Specific examples of the phenol-based antioxidant may include commercial products such as Irganox 1010 (manufactured by BASF, trademark), Irganox 1076 (manufactured by BASF, trademark), Irganox 1330 (manufactured by BASF, trademark), Irganox 3114 (manufactured by BASF, trademark), Irganox 3125 (manufactured by BASF, trademark), BHT (manufactured by Takeda Pharmaceutical Company Limited, trademark), Cyanox 1790 (manufactured by American Cyanamid Company, trademark), and Sumilizer GA-80 (manufactured by Sumitomo Chemical Company, Limited, trademark).

Examples of the phosphorus-based antioxidant include triphenyl phosphite, trisnonylphenyl phosphite, tris(2,4-di-tert-butylphenyl) phosphite, tridecyl phosphite, trioctyl phosphite, trioctadecyl phosphite, didecylmonophenyl phosphite, dioctylmonophenyl phosphite, diisopropylmonophenyl phosphite, monobutyldiphenyl phosphite, monodecyldiphenyl phosphite, monooctyldiphenyl phosphite, bis(2,6-di-tert-butyl-4-methylphenyl)pentaerythritol diphosphite, 2,2-methylenebis(4,6-di-tert-butylphenyl)octyl phosphite, bis(nonylphenyl)pentaerythritol diphosphite, bis(2,4-di-tert-butylphenyl)pentaerythritol diphosphite, and distearylpentaerythritol diphosphite.

Specific examples of the phosphorus-based antioxidant may include commercial products such as Irgafos 168 (manufactured by BASF, trademark), Irgafos 12 (manufactured by BASF, trademark), Irgafos 38 (manufactured by BASF, trademark), ADK STAB 329K (manufactured by ADEKA Corporation, trademark), ADK STAB PEP-36 (manufactured by ADEKA Corporation, trademark), ADK STAB PEP-8 (manufactured by ADEKA Corporation, trademark), Irgafos P-EPQ (manufactured by Clariant, trademark), Weston 618 (manufactured by GE, trademark), Weston 619G (manufactured by GE, trademark), and Weston 624 (manufactured by GE, trademark).

The content of the antioxidant (E) in the polycarbonate-based resin composition is preferably from 0.01 part by mass to 0.5 part by mass, more preferably from 0.01 part by mass to 0.2 part by mass with respect to 100 parts by mass of the polycarbonate-based resin (A). A case in which the content falls within the ranges is preferred because thermal stability in a molding step or the like, and the long-term thermal stability of the molded article can be maintained, and a reduction in molecular weight of the composition hardly occurs.

The polycarbonate-based resin composition of the present invention preferably has a viscosity-average molecular weight (Mv) of 17,000 or more and 28,000 or less. The viscosity-average molecular weight may be adjusted by the blending conditions of the respective components. The setting of the viscosity-average molecular weight within the range can provide a polycarbonate-based resin excellent in moldability and more excellent in flame retardancy.

The viscosity-average molecular weight (Mv) is more preferably 19,000 or more, still more preferably 20,000 or more. From the viewpoint of moldability, the upper limit value thereof is more preferably 27,500 or less, still more preferably 26,000 or less, still more preferably 25,500 or less, particularly preferably 22,500 or less.

As described above, the viscosity-average molecular weight (Mv) is a value calculated from Schnell's equation by measuring the limiting viscosity $[\eta]$ of a methylene chloride solution at 20° C. The "viscosity-average molecular weight of the composition" may be measured by performing typical treatments (e.g., the dissolution of the composition in a treatment solution and the removal of insoluble matter) at the time of the viscosity measurement.

<Molded Article>

A molded article formed of the polycarbonate-based resin composition of the present invention may be obtained by blending the above-mentioned respective components, kneading the mixture, and molding the kneaded product.

A kneading method is not particularly limited, and an example thereof is a method using, for example, a ribbon blender, a Henschel mixer, a Banbury mixer, a drum tumbler, a single-screw extruder, a twin-screw extruder, a cokneader, or a multi-screw extruder. In addition, a heating temperature at the time of the kneading is selected from the range of typically from 240° C. to 330° C., preferably from 250° C. to 320° C.

Various conventionally known molding methods may each be used as a molding method, and examples thereof include an injection molding method, an injection compression molding method, an extrusion molding method, a blow molding method, a press molding method, a vacuum molding method, and an expansion molding method.

A component to be incorporated except the polycarbonate-based resin may be added after having been melt-kneaded together with the polycarbonate-based resin or any other thermoplastic resin in advance, that is, as a master batch.

Alternatively, the polycarbonate-based resin composition is preferably pelletized and subjected to injection molding, and a general injection molding method or injection compression molding method, and a special molding method, such as a gas-assisted molding method, may be used. Thus, various molded articles can be produced.

When the molded article of the present invention is used as an appearance member, a molding technology for an improvement in appearance, such as a heat cycle molding method, a high-temperature mold, or a heat-insulating mold, is preferably used.

Injection compression molding, or high-pressure or ultra-high-pressure injection molding is preferably used for obtaining a large and thin-walled injection-molded article, and partial compression molding or the like may be used in the molding of a molded article having a partial thin-walled portion.

EXAMPLES

The present invention is more specifically described by way of Examples. However, the present invention is by no means limited by these Examples. In each example, characteristic values and evaluation results were determined in the following manner.

<Viscosity-Average Molecular Weight>

A viscosity-average molecular weight (Mv) was calculated from the following equation (Schnell's equation) by using a limiting viscosity [η] determined through the measurement of the viscosity of a methylene chloride solution at 20° C. with an Ubbelohde-type viscometer.

$$[\eta]=1.23\times10^{-5}\times Mv^{0.83}$$

<Measurement of Chloroformate Group Concentration (CF Value)>

Measurement was performed on the basis of a chlorine ion concentration with reference to JIS K 8203-1994 by using oxidation-reduction titration and silver nitrate titration.

10 mL of a polycarbonate oligomer solution was collected in a 200-milliliter Erlenmeyer flask with a whole pipette. The inside of the whole pipette was washed with 20 mL of methylene chloride, and the washing liquid was also added to the above-mentioned Erlenmeyer flask. About 10 mL of a NaOH-MeOH solution (obtained by dissolving 36 g of sodium hydroxide in 39 mL of pure water to prepare 48 mass % aqueous NaOH, and loading and dissolving the aqueous solution in 500 mL of methanol) was added to the Erlenmeyer flask, and was stirred for 3 minutes so that a chloroformate group was hydrolyzed. Further, 10 mL of deionized water was added to the Erlenmeyer flask, and it was recognized that a state in which no precipitate was present in the Erlenmeyer flask was established.

While the contents in the Erlenmeyer flask were stirred, a 1 mol/L aqueous solution of nitric acid (manufactured by Junsei Chemical Co., Ltd., normal solution for volumetric analysis) was gradually added to the flask to neutralize and adjust the pH of the contents to from 6 to 7 while the pH was identified with universal pH test paper. Three drops of a uranine solution (prepared by dissolving 0.1 g of uranine (manufactured by Kanto Chemical Co., Inc.) in 20 mL of ethanol) were added to the Erlenmeyer flask, and the development of a yellow color was observed. After that, while the contents in the Erlenmeyer flask were stirred, a 1 mol/L aqueous solution of silver nitrate (for volumetric analysis, manufactured by Wako Pure Chemical Industries, Ltd., f=1.001) was dropped with a burette, and its dropping amount when the color of the contents in the Erlenmeyer flask changed from the yellow color to a pink color was recorded. A chloroformate group concentration (CF) was determined from the following calculation equation:

$$CF = \text{dropping amount (mL) of 1 mol/L silver nitrate} \times f \times 1/10$$

wherein f=1.001 (factor of the aqueous solution of silver nitrate).

<Quantification Method for Amine Terminal Amount>

Quantification method for an amine terminal fraction in all the terminals of a p-tert-butylphenol (PTBP)-terminated polycarbonate obtained by copolymerizing 1,1,1-tris(4-hydroxyphenyl)ethane (THPE)

NMR apparatus: ECA-500 manufactured by JEOL Resonance Co., Ltd.
Probe: TH5 corresponding to 5φ NMR sample tube
Observed range: −5 ppm to 15 ppm
Observation center: 5 ppm
Pulse repetition time: 9 sec
Pulse width: 45°
Number of scans: 256 times
NMR sample tube: 5φ
Sample amount: 30 mg to 40 mg
Solvent: deuterochloroform
Measurement temperature: room temperature
A: an integrated value of hydrogen at an ortho-position with respect to the OH group of a BPA-OH terminal moiety observed around δ 6.6 to δ 6.8
B: an integrated value of the methylene group of an amine terminal moiety observed around δ 3.3 to δ 3.5
C: an integrated value of the butyl group of a p-tert-butylphenyl moiety observed around δ 1.2 to δ 1.4
a=A/2
b=B/4
c=C/9
T=a+b+c Amine terminal fraction (mol %)=$b/T\times 100$ Production Example 1

(1) Polycarbonate Oligomer Synthesis Step

Sodium dithionite was added in an amount of 2,000 ppm by mass with respect to bisphenol A (hereinafter sometimes abbreviated as "BPA") to be dissolved later to 5.6 mass % aqueous sodium hydroxide, and bisphenol A was dissolved in the mixture so that the concentration of bisphenol A became 13.5 mass %. Thus, a solution of bisphenol A in aqueous sodium hydroxide was prepared.

The solution of bisphenol A in aqueous sodium hydroxide, dichloromethane, and phosgene were continuously passed through a tubular reactor having an inner diameter of 6 mm and a tube length of 30 m at flow rates of 40 L/hr, 20 L/hr, and 4.0 kg/hr, respectively. The tubular reactor had a jacket portion and the temperature of the reaction liquid was kept at 40° C. or less by passing cooling water through the jacket.

The reaction liquid that had exited the tubular reactor was continuously introduced into a baffled vessel type reactor provided with a sweptback blade and having an internal volume of 40 L. The solution of bisphenol A in aqueous sodium hydroxide, 25 mass % aqueous sodium hydroxide, water, and a 1 mass % aqueous solution of triethylamine (hereinafter sometimes abbreviated as "TEA") were further added to the reactor at flow rates of 1.4 L/hr, 0.03 L/hr, 8 L/hr, and 0.32 L/hr, respectively, to perform a reaction.

An aqueous phase was separated and removed by continuously taking out the reaction liquid overflowing the vessel type reactor and leaving the reaction liquid at rest. Then, a dichloromethane phase was collected. The polycarbonate oligomer thus obtained had a concentration of 236 g/L and a chloroformate group concentration of 0.72 mol/L. The dichloromethane phase was free of TEA.

(2) Polycarbonate Polymerization Step 20.0 L of the oligomer solution, 3.6 L of dichloromethane, and 4.0 mL (0.002 mol/mol with respect to the chloroformate group amount) of TEA were loaded into a 50-liter vessel-type reactor including a baffle board and a paddle-type stirring blade. A solution of THPE in aqueous sodium hydroxide (obtained by dissolving 110.2 g of THPE in an aqueous solution obtained by dissolving 115 g of sodium hydroxide in 1.7 L of water) was added as a branching agent to the mixture to perform a polymerization reaction for 20 minutes.

Subsequently, a solution obtained by dissolving 168.6 g of p-tert-butylphenol (PTBP) in 1.0 L of dichloromethane and a solution of BPA in aqueous sodium hydroxide (obtained by dissolving 749 g of sodium hydroxide in 11.0 L of water, and dissolving 2.9 g of sodium dithionite and 1,445 g of BPA in the solution) were added to the resultant to perform a polymerization reaction for 40 minutes.

12 L of dichloromethane was added to dilute the resultant. After that, the diluted liquid was separated into an organic phase containing a polycarbonate-based resin, and an aqueous phase containing excess amounts of BPA and sodium hydroxide, and the organic phase was isolated. The resultant solution of the polycarbonate-based resin in dichloromethane was sequentially washed with 0.03 mol/L aqueous sodium hydroxide and 0.2 mol/L hydrochloric acid in amounts of 15 vol % each with respect to the solution. Next, the solution was repeatedly washed with pure water until an electric conductivity in an aqueous phase after the washing became 0.05 μS/m or less. The solution of the polycarbonate-based resin in dichloromethane obtained by the washing was concentrated and pulverized, and the resultant flake was dried under reduced pressure at 100° C. to provide a polycarbonate-based resin PC 1.

Production Example 2

A polycarbonate-based resin PC2 was obtained in the same manner as in Production Example 1 except that in the step (2) of Production Example 1, the amount of TEA was changed to 12.0 mL (0.006 mol/mol with respect to the chloroformate group amount), the amount of THPE was changed to 127.9 g, and the amount of PTBP was changed to 205.7 g.

Production Example 3

A polycarbonate-based resin PC3 was obtained in the same manner as in Production Example 1 except that in the step (2) of Production Example 1, the amount of TEA was changed to 40.0 mL (0.020 mol/mol with respect to the chloroformate group amount), and the amount of PTBP was changed to 195.8 g.

Production Example 4

A polycarbonate-based resin PC4 was obtained in the same manner as in Production Example 1 except that in the step (2) of Production Example 1, the amount of THPE was changed to 165.4 g, and the amount of PTBP was changed to 228.3 g.

Production Example 5

A polycarbonate-based resin PC5 was obtained in the same manner as in Production Example 1 except that in the step (2) of Production Example 1, the amount of TEA was changed to 20.0 mL (0.010 mol/mol with respect to the chloroformate group amount), the amount of THPE was changed to 166.0 g, and the amount of PTBP was changed to 253.6 g.

Production Example 6

A polycarbonate-based resin PC6 was obtained in the same manner as in Production Example 1 except that in the step (2) of Production Example 1, the amount of TEA was changed to 40.0 mL (0.020 mol/mol with respect to the chloroformate group amount), the amount of THPE was changed to 166.0 g, and the amount of PTBP was changed to 247.6 g.

The polycarbonate-based resins PC1 to PC6 obtained in the respective production examples are summarized in Table 1 and Table 2. The viscosity-average molecular weights (Mv) of the polycarbonate-based resins PC1 to PC6 were measured. The viscosity-average molecular weights are shown in Table 1 and Table 2 together with the compositions of the resins.

TABLE 1

| | | Production Example | | |
|---|---|---|---|---|
| | | 1 | 2 | 3 |
| PC-based resin (A) | | PC1 | PC2 | PC3 |
| THPE amount | mol % | 1.6 | 1.8 | 1.6 |
| TEA/CF | mol/mol | 0.002 | 0.006 | 0.020 |
| Mv | | 23,500 | 23,200 | 20,900 |
| Amine terminal ratio | mol % | 0.7 | 2.2 | 4.9 |

TABLE 2

| | | Production Example | | |
|---|---|---|---|---|
| | | 4 | 5 | 6 |
| PC-based resin (A) | | PC4 | PC5 | PC6 |
| THPE amount | mol % | 2.7 | 2.5 | 2.4 |
| TEA/CF | mol/mol | 0.002 | 0.010 | 0.020 |
| Mv | | 22,700 | 24,700 | 20,500 |
| Amine terminal ratio | mol % | 0.3 | 2.9 | 3.7 |

<Flame Retardant (B)>
Nonafluorobutanesulfonic acid potassium salt [manufactured by Mitsubishi Materials Corporation, product name: "Eftop KFBS"]

<Polyorganosiloxane (C)>
Reactive silicone compound [manufactured by Shin-Etsu Chemical Co., Ltd., product name: "KR511": containing a phenyl group, a methoxy group, and a vinyl group, refractive index=1.518]

<Antioxidant (E)>
Antioxidant: "IRGAFOS 168 (product name)" [tris(2,4-di-t-butylphenyl) phosphite, manufactured by BASF Japan]

Examples 1 to 4, and Comparative Examples 1 and 2

The polycarbonate-based resin (A) corresponding to any one of the polycarbonate-based resins PC1 to PC6 obtained in the above-mentioned production processes, and the other respective components were mixed at blending ratios shown in Table 3 and Table 4. Each of the mixtures was supplied to a vented twin-screw extruder (manufactured by Tanabe Plastics Machinery Co., Ltd., VS40-28), and was melt-kneaded at a screw revolution number of 100 rpm, an ejection amount of 10 kg/hr, and a set temperature of 280° C. to provide an evaluation pellet sample.

[Evaluation Test]

The pellet obtained in the foregoing was dried at 120° C. for 8 hours, and was then subjected to injection molding with an injection molding machine (manufactured by Toshiba Machine Co., Ltd., EC75PNII, screw diameter: 36 mm(p) at a cylinder temperature of 290° C. and a mold temperature of 90° C. to provide a test piece having a thickness of 0.8 mm (length: 125 mm, width: 13 mm). At the time of the production of the test piece, the resin was loaded from both ends opposite to each other in the long axis direction of the mold (corresponding to the width of the test piece). A vertical flame test was performed by using the test pieces in conformity with the Underwriters Laboratory Subject 94 (UL94) flame test, and the test pieces were evaluated by being classified into ranks "V-0", "V-1", and "V-2". A test piece classified into the rank "V-0" means that the test piece is excellent in flame retardancy.

TABLE 3

|  |  | Comparative Example 1 | Example 1 | Example 2 |
|---|---|---|---|---|
| PC-based resin (A) |  | PC1 | PC2 | PC3 |
|  | part(s) by mass | 100 | 100 | 100 |
| THPE amount | mol % | 1.6 | 1.8 | 1.6 |
| Amine terminal ratio | mol % | 0.7 | 2.2 | 4.9 |
| Flame retardant (B) | part(s) by mass | 0.08 | 0.08 | 0.08 |
| POS (C) | part(s) by mass | 0.3 | 0.3 | 0.3 |
| Antioxidant (E) | part(s) by mass | 0.1 | 0.1 | 0.1 |
| Flame retardancy | Combustion time second(s) | 127 | 98 | 42 |
|  |  | V-2 out | V-2 | V-0 |

TABLE 4

|  |  | Comparative Example 2 | Example 3 | Example 4 |
|---|---|---|---|---|
| PC-based resin (A) | part(s) | PC4 | PC5 | PC6 |
|  | by mass part(s) by mass | 100 | 100 | 100 |
| THPE amount | mol % | 2.7 | 2.5 | 2.4 |
| Amine terminal ratio | mol % | 0.3 | 2.9 | 3.7 |
| Flame retardant (B) | part(s) by mass | 0.08 | 0.08 | 0.08 |
| POS (C) | part(s) by mass | 0.3 | 0.3 | 0.3 |
| Antioxidant (E) | part(s) by mass | 0.1 | 0.1 | 0.1 |
| Flame retardancy | Combustion time second(s) | 76 | 57 | 27 |
|  |  | V-1 | V-1 | V-0 |

INDUSTRIAL APPLICABILITY

According to the present invention, there can be obtained such polycarbonate-based resin that, without the impairment of excellent physical properties that the polycarbonate-based resin has, the dripping resistance of the resin itself is improved.

The invention claimed is:

1. A polycarbonate-based resin having a ratio of an amine terminal to all terminal groups of 3.7 mol % or more and 10.0 mol % or less,
   wherein the polycarbonate-based resin comprises 10 parts by mass to 100 parts by mass of a branched polycarbonate-based resin (A-1) and 0 parts by mass to 90 parts by mass of an aromatic polycarbonate-based resin (A-2) except the branched polycarbonate-based resin (A-1), wherein each of the branched polycarbonate-based resin (A-1) and the aromatic polycarbonate-based resin (A-2) has a ratio of the amine terminal to all terminal groups of 3.7 mol % or more and 10.0 mol % or less,
   wherein the amine terminal has a structure represented by the following formula (ii),

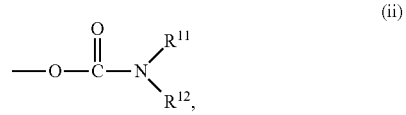

(ii)

wherein, $R^{11}$ and $R^{12}$ each independently represent a substituted or unsubstituted alkyl group having 1 to 6 carbon atoms, a substituted or unsubstituted cycloalkyl group having 5 to 8 carbon atoms, or a substituted or unsubstituted aryl group having 6 to 12 carbon atoms, and wherein the polycarbonate-based resin does not include a repeating unit of represented by the following general formula (II'):

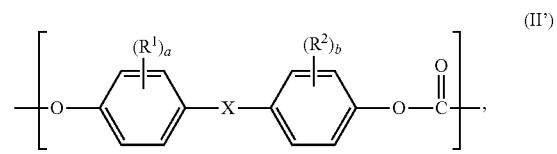

(II')

wherein $R^1$ and $R^2$ each independently represent a halogen atom, X is an isopropylidene group and "a" and "b" are 2.

2. The polycarbonate-based resin according to claim 1, wherein the polycarbonate-based resin has the ratio of the amine terminal to all terminal groups of 5.0 mol % or less.

3. The polycarbonate-based resin according to claim 1, wherein the polycarbonate-based resin has a repeating unit represented by the following general formula (II):

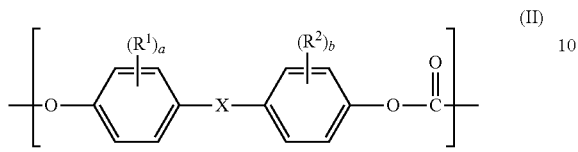

wherein $R^1$ and $R^2$ each independently represent an alkyl group having 1 to 6 carbon atoms, or an alkoxy group having 1 to 6 carbon atoms, X represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, or —CO—, and "a" and "b" each independently represent an integer of from 0 to 4.

4. The polycarbonate-based resin according to claim 1, wherein the branched polycarbonate-based resin (A-1) has a branched structure represented by the following general formula (I), and has a branching ratio of 0.3 mol % or more and 3.0 mol % or less:

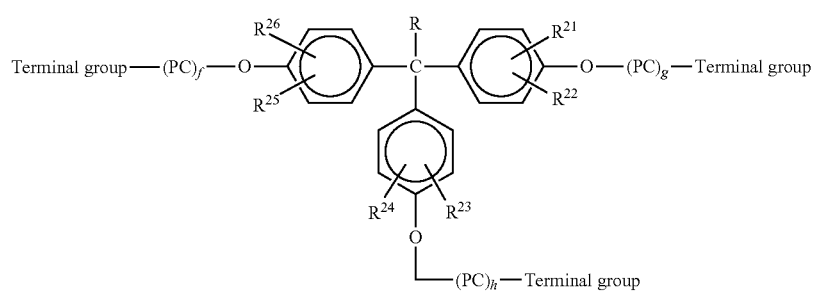

wherein R represents a hydrogen atom or an alkyl group having 1 to 5 carbon atoms, $R^{21}$ to $R^{26}$ each independently represent a hydrogen atom, an alkyl group having 1 to 5 carbon atoms, or a halogen atom, PC represents a polycarbonate moiety, and "f", "g", and "h" each represent an integer.

5. The polycarbonate-based resin according to claim 4, wherein the branched structure represented by the general formula (I) is a structure derived from 1,1,1-tris(4-hydroxyphenyl)ethane.

6. The polycarbonate-based resin according to claim 1, wherein the polycarbonate-based resin has a viscosity-average molecular weight of 17,000 or more and 28,000 or less.

7. A polycarbonate-based resin composition, comprising:
the polycarbonate-based resin (A) of claim 1;
a flame retardant (B), a polyorganosiloxane (C), and an antioxidant (E).

8. A method of producing a polycarbonate-based resin, comprising:
a step (1) of causing a dihydric phenol and phosgene to react with each other in an organic solvent to produce a polycarbonate oligomer; and a step (2) of causing the polycarbonate oligomer, the dihydric phenol, and a terminal stopper to react with each other to produce the polycarbonate-based resin, the step (2) comprising using an amine-based catalyst as a polymerization catalyst at a molar ratio of 0.015 or more and 0.030 or less with respect to a chloroformate group of the polycarbonate oligomer obtained in the step (1), wherein the polycarbonate-based resin has a ratio of an amine terminal to all terminal groups of 3.7 mol % or more and 10.0 mol % or less, wherein the method further comprises adding a branching agent in the step (1) and/or the step (2);

wherein the amine terminal has a structure represented by the following formula (ii),

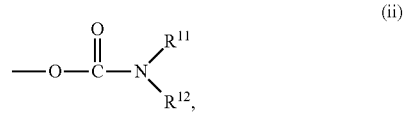

wherein, $R^{11}$ and $R^{12}$ each independently represent a substituted or unsubstituted alkyl group having 1 to 6 carbon atoms, a substituted or unsubstituted cycloalkyl group having 5 to 8 carbon atoms, or a substituted or unsubstituted aryl group having 6 to 12 carbon atoms, and wherein the polycarbonate-based resin does not include a repeating unit of represented by the following general formula (II'):

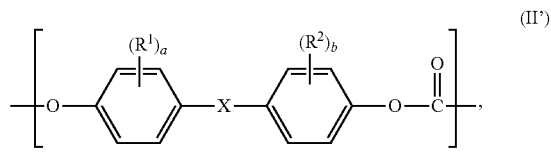

wherein $R^1$ and $R^2$ each independently represent a halogen atom, X is an isopropylidene group and "a" and "b" are 2.

9. The method of producing a polycarbonate-based resin according to claim 8, wherein the branching agent has a structure represented by the following general formula (III):

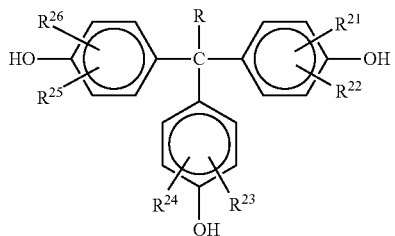

(III)

wherein R represents a hydrogen atom or an alkyl group having 1 to 5 carbon atoms, and $R^{21}$ to $R^{26}$ each independently represent a hydrogen atom, an alkyl group having 1 to 5 carbon atoms, or a halogen atom.

10. The method of producing a polycarbonate-based resin according to claim 8, wherein the branching agent is further added in the step (2).

11. The method of producing a polycarbonate-based resin according to claim 9, wherein the branching agent represented by the general formula (III) is added at 0.3 mol % or more and 3.0 mol % or less with respect to a total number of moles of the dihydric phenol, the branching agent, and the terminal stopper added in the step (1) and the step (2).

12. The method of producing a polycarbonate-based resin according to claim 9, wherein the branching agent represented by the general formula (III) is 1,1,1-tris(4-hydroxyphenyl)ethane.

13. The method of producing a polycarbonate-based resin according to claim 8, wherein the amine-based catalyst is a tertiary amine or a salt thereof.

14. The method of producing a polycarbonate-based resin according to claim 8, wherein the amine-based catalyst is triethylamine.

\* \* \* \* \*